(12) United States Patent
Kim et al.

(10) Patent No.: US 7,287,176 B2
(45) Date of Patent: Oct. 23, 2007

(54) APPARATUS, METHOD AND STORAGE MEDIUM FOR CARRYING OUT DESKEW AMONG MULTIPLE LANES FOR USE IN DIVISION TRANSMISSION OF LARGE-CAPACITY DATA

(75) Inventors: Dae Up Kim, Daejeon (KR); Sung Soo Kang, Daejeon (KR); Hae Won Jung, Daejeon (KR); Hyeong Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1077 days.

(21) Appl. No.: 10/444,749

(22) Filed: May 23, 2003

(65) Prior Publication Data

US 2003/0219040 A1   Nov. 27, 2003

(30) Foreign Application Priority Data

May 24, 2002   (KR)   .................... 10-2002-0028844

(51) Int. Cl.
*G06F 1/00*   (2006.01)
*G06F 1/04*   (2006.01)
*G06F 1/24*   (2006.01)
*G06F 11/00*   (2006.01)

(52) U.S. Cl. ...................... 713/500; 713/503
(58) Field of Classification Search ................ 713/500, 713/503
See application file for complete search history.

(56) References Cited

U.S. PATENT DOCUMENTS 4,788,681 A * 11/1988 Thomas et al. ............. 370/509

(Continued)

FOREIGN PATENT DOCUMENTS

KR   1999-0077455   10/1999

(Continued)

OTHER PUBLICATIONS

IEEE Drat P802.3ae/D3.), Mar. 26, 2001, 48. Physical Coding Sublayer (PCS) and Physical Medium Attachment (PMA) sublayer, type 10GBASE-X (pp. 283-314).

*Primary Examiner*—Rehana Perveen
*Assistant Examiner*—Michael J. Brown
(74) *Attorney, Agent, or Firm*—Blakely, Sokoloff, Taylor & Zafman

(57) ABSTRACT

An apparatus, a method and a storage medium for carrying out a deskew among multiple lanes for use in a division transmission of large-capacity data. The method comprises the steps of detecting alignment characters from data streams on a lane-by-lane basis, determining whether a skew among the lanes is generated by comparing reception points of the alignment characters for respective lanes, if the skew among the lanes is generated, storing the alignment characters in a first storage column of a shift register on the lane-by-lane basis and storing data being subsequent to the alignment characters in a second storage column, at a time of a last alignment character detection, setting a last storage section on the lane-by-lane basis and indicating an alignment completion, shifting the data to output the data stored in the first storage column when the data is inputted into the last storage section, and intactly outputting the data streams before the deskew is completely accomplished in the storage device and outputting the aligned data streams after the deskew is completely accomplished.

10 Claims, 9 Drawing Sheets

U.S. PATENT DOCUMENTS

| | | |
|---|---|---|
| 5,425,020 A | 6/1995 | Grett et al. |
| 5,461,622 A * | 10/1995 | Bleickardt et al. .......... 370/470 |
| 6,167,528 A | 12/2000 | Arcoleo |
| 6,252,904 B1 | 6/2001 | Agazzi et al. |
| 6,757,231 B2 * | 6/2004 | Fujiwara ................... 369/53.35 |
| 6,996,738 B2 * | 2/2006 | Chiang ....................... 713/503 |
| 2003/0223469 A1 * | 12/2003 | Deng ......................... 370/542 |

FOREIGN PATENT DOCUMENTS

KR     2001-0057336     7/2001

* cited by examiner

APPARATUS, METHOD AND STORAGE MEDIUM FOR CARRYING OUT DESKEW AMONG MULTIPLE LANES FOR USE IN DIVISION TRANSMISSION OF LARGE-CAPACITY DATA

BACKGROUND OF THE INVENTION

1. Field of the Invention

The present invention relates to a data transmission/reception technique in a 10 Gbps optical fiber channel and a physical layer of a 10 Gbps Ethernet, and more particularly to an apparatus and a method for carrying out a deskew among multiple lanes for use in a division transmission of large-capacity data, which can parallel process multiple lanes having a bit rate of several Gbps by carrying out a deskew among the multiple lanes in a case of the division transmission of the larger-capacity data and performing a high-speed transmission of more than the bit rate of 10 Gbps.

2. Description of the Related Art

A communication environment mainly relying on a local area network (LAN) needs an increased bandwidth in these days but there are limitations in an existing 10/100 Mbps Ethernet being constructed. Accordingly, an Ethernet system having communication capacity of more than a bit rate of 1 Gbps is strongly needed.

In response to such a need, a 10 Gbps Ethernet system has been developed. A physical layer of a 10 GBASE-X 10 Gbps Ethernet system such as the 10 Gbps Ethernet system is made up of a physical coding sublayer (PCS), a physical media attachment (PMA) sublayer and a physical media dependent (PMD) sublayer.

Among these sublayers, the PCS is used for parallel processing four 8B/10B lanes.

However, when an optical module transmits data over the PCS and the PMA, the data is transmitted to the four lanes separated from each other after the data is coded, the four lanes acting as one data channel having a bit rate of 10 Gbps. At this time, a skew among parallel lanes is caused in a reception side.

As described above, a division transmission of large-capacity data is necessary for transmitting the data having a bit rate of more than 10 Gbps in a digital signal level but a conventional Gbps multi-channel technique can not address the skew among the lanes where one large-capacity channel is divisionally transmitted to the four lanes composed of independent character streams.

Because it has been limited to several Gbps communication, communication within the PCS is accomplished on a byte-by-byte basis (at every 10 bits after coding) and therefore that a deskew can only be implemented on a bit-by-bit basis. For the sake of the divisional transmission of a number of character streams in a high-speed data transmission of more than 10 Gbps, there is needed a new alignment method based on a byte-by-byte or character-by-character basis as well as a skew compensation based on a bit-by-bit basis within a bus. However, a practical alignment method for aligning the four 8B/10B lanes has not been suggested up to now.

For example, prior-art problems are as follows.

FIG. 1 is a block diagram illustrating a physical coding sublayer (PCS) of a prior-art 10 GBASE-X 10 Gbps Ethernet receiver. The PCS of the prior-art 10 GBASE-X 10 Gbps Ethernet is made up of a synchronization function block 101, a deskew function block 102 and a decoding function block 103.

The synchronization function block 101 receives control signals representing a detection of a signal on each lane and 10 bit parallel signals as data streams from a physical media attachment (PMA) sublayer and detects a comma character of an 8B/10B code contained in the received signals to output the control signals C1 representing a synchronization status of each lane, respectively, and the received data streams.

Thereafter, the deskew function block 102 receives the control signals C1 and the data streams to recognize whether alignment characters of the data streams appear in all the lanes and then outputs control signals C2 representing that the skew has been adjusted or has not been adjusted along with the data streams.

Finally, the decoding function block 103 decodes the data streams received from the deskew function block 102 to 8B/10B codes and provides a medium access control (MAC) part with the decoded data streams.

FIG. 2 is a flow chart illustrating a deskew process in the prior-art 10 GBASE-X 10 Gbps Ethernet receiver. If the synchronization function block 101 fails a reset or synchronization process (sync_status='FAIL'), a procedure of the deskew process enters step 201 of "loss_of_alignment" as an initial status, and a control signal "enable_deskew" of a TRUE signal is outputted to enable the deskew process at the above step 201.

However, when the control signal "enable_deskew" is the TRUE signal, there is no way in which the deskew process can be carried out. Where the deskew process is once applied to a character stream or the skew is generated in the character stream, an alignment status of the character stream is monitored. Then, it is recognized whether a character stream ||A|| aligned three times has been detected through the monitoring of the alignment status of the character stream, the character stream ||A|| being composed of four characters /A/ aligned in an 8B/10B code, and any information about the alignment status is reported. Conventionally, only the above description is known.

In other words, only a function of monitoring the alignment status and reporting the information about the alignment status is suggested in the prior art and the deskew cannot be accomplished in the prior art.

FIG. 3 is a timing chart showing output signals having a skew to be outputted from the synchronization function block 101 of the PCS contained in the prior-art 10 GBASE-X 10 Gbps Ethernet receiver. The data streams by the 8B/10B coding are transmitted to the four independent lanes. At this time, where the data streams are transmitted from a transmission function block of the PCS through an optical fiber channel and an electrical channel, the alignment characters (e.g., /A/) contained in the data streams have the skew at different times as shown in FIG. 3.

However, there is a problem that the skew among the lanes cannot be addressed by the prior art.

SUMMARY OF THE INVENTION

Therefore, the present invention has been made in view of the above problems, and it is an object of the present invention to provide an apparatus, a method and a storage medium for carrying out a deskew among multiple lanes for use in a division transmission of large-capacity data, which are capable of parallel transmitting data having a bit rate of more than 10 Gbps being appropriate to an existing 8B/10B coding format through the multiple lanes by carrying out a multiple-lane deskew between a synchronization function block and a decoding function block contained in a physical coding sublayer (PCS)

In accordance with the present invention, the above and other objects can be accomplished by the provision of an apparatus for carrying out a deskew among multiple lanes for use in a division transmission of large-capacity data, comprising:

first means for detecting alignment characters based on a lane-by-lane basis from character streams as data streams received into the multiple lanes and outputting first signals representing a reception status of an alignment character of each lane, respectively;

second means responsive to the first signals from the first means for outputting at least one second signal to indicate whether the alignment characters have been detected in all the lanes within a deskew setting section from the instant of detecting a first alignment character from one lane;

parallel storage control means responsive to the first and second signals and the received data streams for setting data being subsequent to the alignment character of each lane and sequentially storing the data in a storage device, sequentially outputting the stored data to align the data streams if the data of one section is completely stored; and output selection means for intactly outputting the data streams before the deskew is completely accomplished in the storage device and outputting the aligned data streams from the parallel storage control means after the deskew is completely accomplished.

Preferably, the second means may count a first setting time to output a fifth control signal having a high level from a time of a first alignment character detection to a time of a last alignment character detection or a time of a counting completion of the first setting time when the first control signal is a first high level signal.

Preferably, the first setting time may correspond to a maximum generation possible section for the skew being generated among the multiple lanes. Further, the first setting time may correspond to 15 bits.

Preferably, the parallel storage control means may store the alignment characters in a first storage column R(0) of the storage device and sequentially store the data subsequent to the alignment characters in the storage device when a skew among the multiple lanes is generated and the alignment characters based on the lane-by-lane basis are detected, and the parallel storage control means may set a last storage column to a last storage section of each lane when the alignment characters are detected in all the lanes, and the parallel storage control means may output the data of the first storage column on the basis of a FIFO (first-in first-out) scheme if another data is inputted into the last storage section while the stored data is shifted in response to a clock signal, thereby outputting aligned character streams to which a predetermined delay is assigned for the deskew among the multiple lanes.

More preferably, the parallel storage control means may again carry out the deskew when a deskew request signal is generated in the course of maintaining an aligned state.

In accordance with another aspect of the present invention, there is provided a large-capacity Ethernet reception system having a function of a deskew among multiple lanes for use in a division transmission of large-capacity data, comprising:

synchronization means for receiving control signals representing a signal detection of each lane and data streams as 10-bit parallel signals from a physical media attachment (PMA) sublayer, detecting a synchronization state of each lane through a detection of a comma character of an 8B/10B code, and outputting the data streams and at least one synchronization state signal generated from the detected synchronization state;

deskew means having a lane alignment unit for receiving the data streams and the synchronization state signals and aligning a data stream of each lane having a skew, and a monitoring unit for determining the skew by monitoring whether alignment characters of the data streams from the lane alignment unit simultaneously appear in all the lanes and transmitting a determination result;

decoding means for decoding aligned data streams from the deskew means in the form of the 8B/10B code and providing the decoded data streams to a medium access control (MAC) part.

In accordance with yet another aspect of the present invention, there is provided a method for carrying out a deskew among multiple lanes upon receiving large-capacity data from the multiple lanes, comprising the steps of:

a) recognizing and detecting alignment characters from data streams on a lane-by-lane basis;

b) determining whether a skew among the lanes is generated by comparing reception points of the alignment characters for respective lanes;

c) if the skew among the lanes is generated, storing the alignment characters in a first storage column of a shift register on the lane-by-lane basis and storing data being subsequent to the alignment characters in a second storage column;

d) at a time of a last alignment character detection, setting a last storage section on the lane-by-lane basis and indicating an alignment completion;

e) shifting the data to output the data stored in the first storage column when the data is inputted into the last storage section; and f) intactly outputting the data streams before the deskew is completely accomplished in the storage device and outputting the aligned data streams after the deskew is completely accomplished.

In accordance with yet another aspect of the present invention, there is provided a storage medium storing a program for performing the above steps in a large-capacity Ethernet reception system.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the following description, a variety of specific elements such as constituent elements are shown. The description of such elements has been made only for a better understanding of the present invention.

Figure 1:
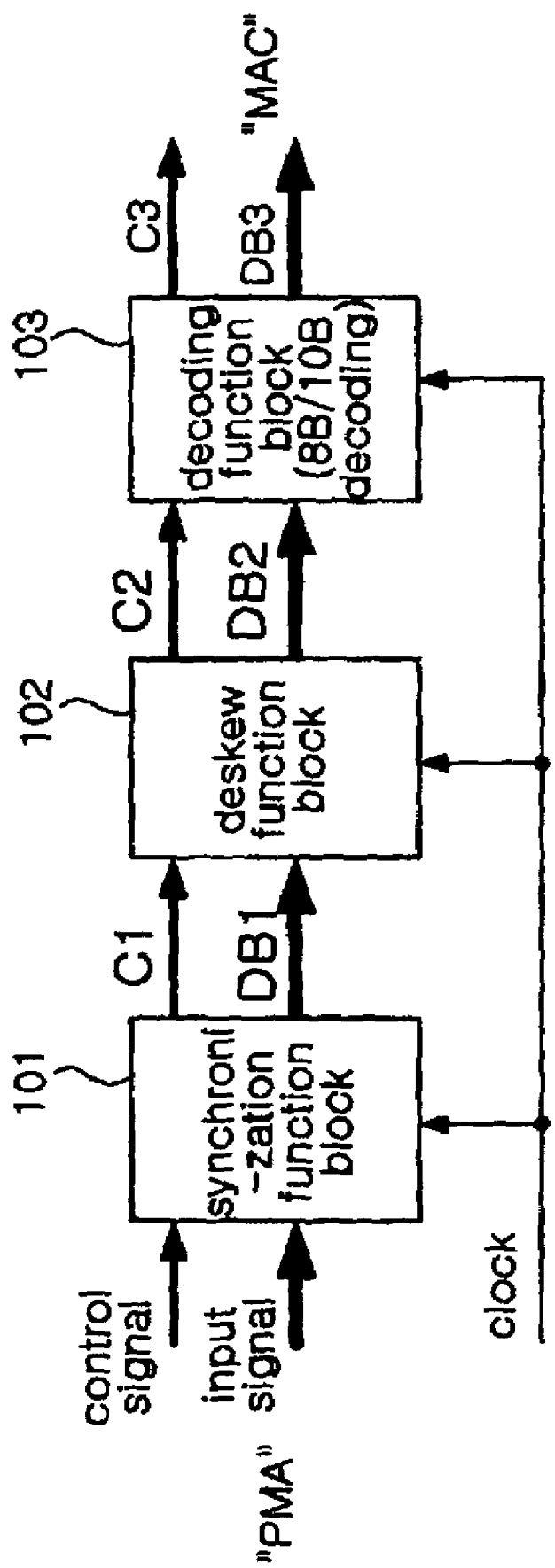
FIG. 1 is a block diagram illustrating a physical coding sublayer (PCS) of a prior-art 10 GBASE-X 10 Gbps Ethernet receiver.
Figure 2:
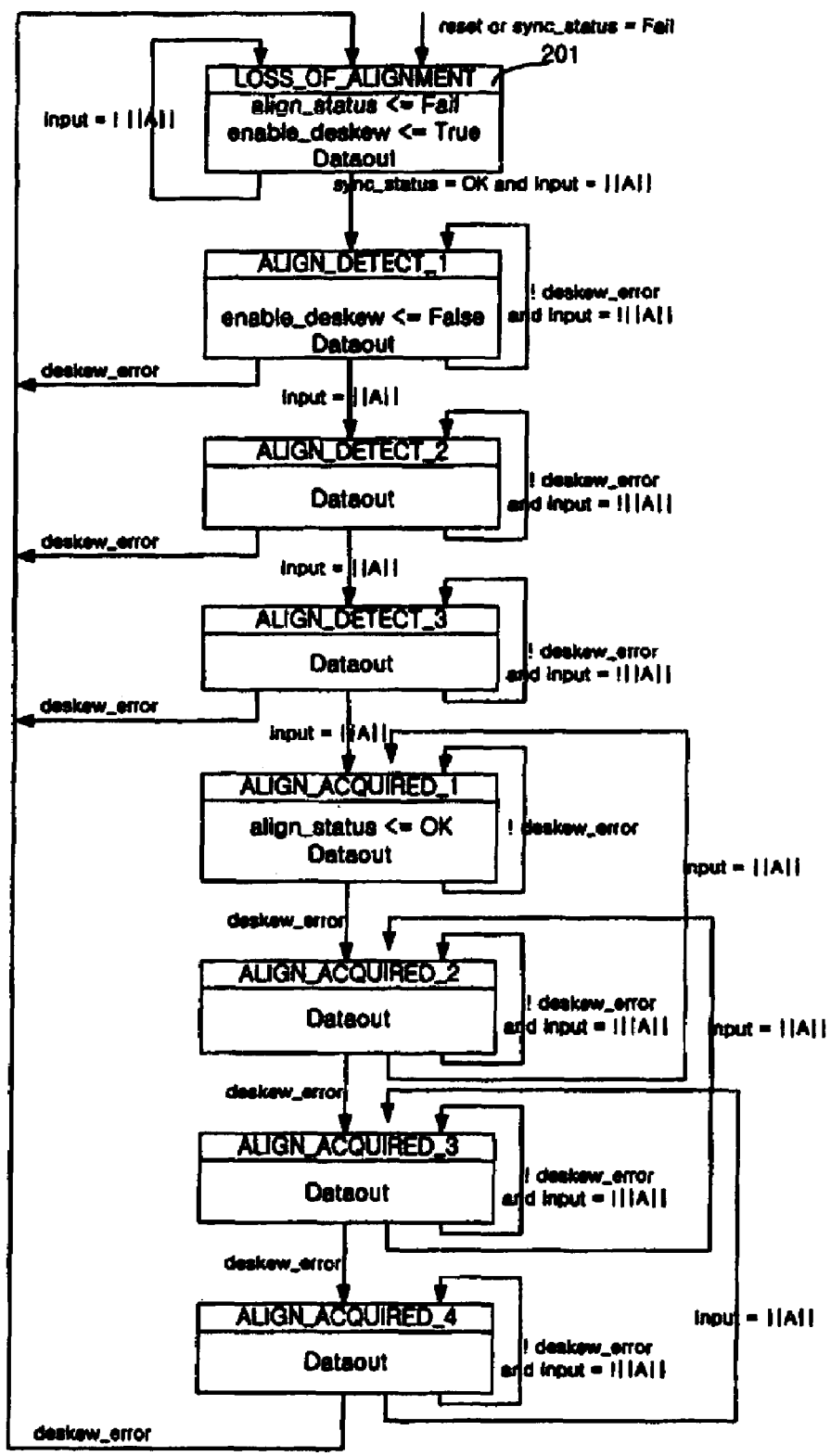
FIG. 2 is a flow chart illustrating a deskew process in the prior-art 10 GBASE-X 10 Gbps Ethernet receiver.
Figure 3:
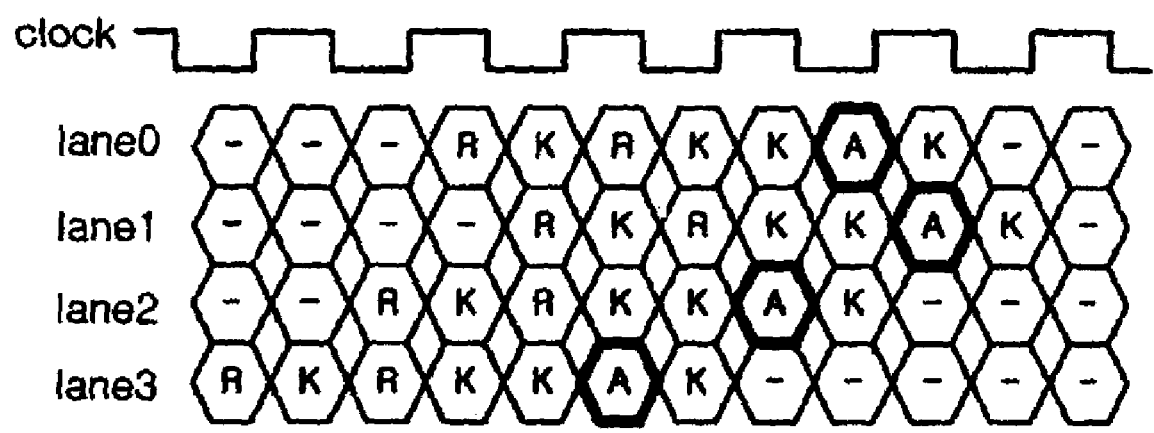
FIG. 3 is a timing chart showing signals having a skew to be outputted from a synchronization function block of the PCS contained in the prior-art 10 GBASE-X 10 Gbps Ethernet receiver.
Figure 4:
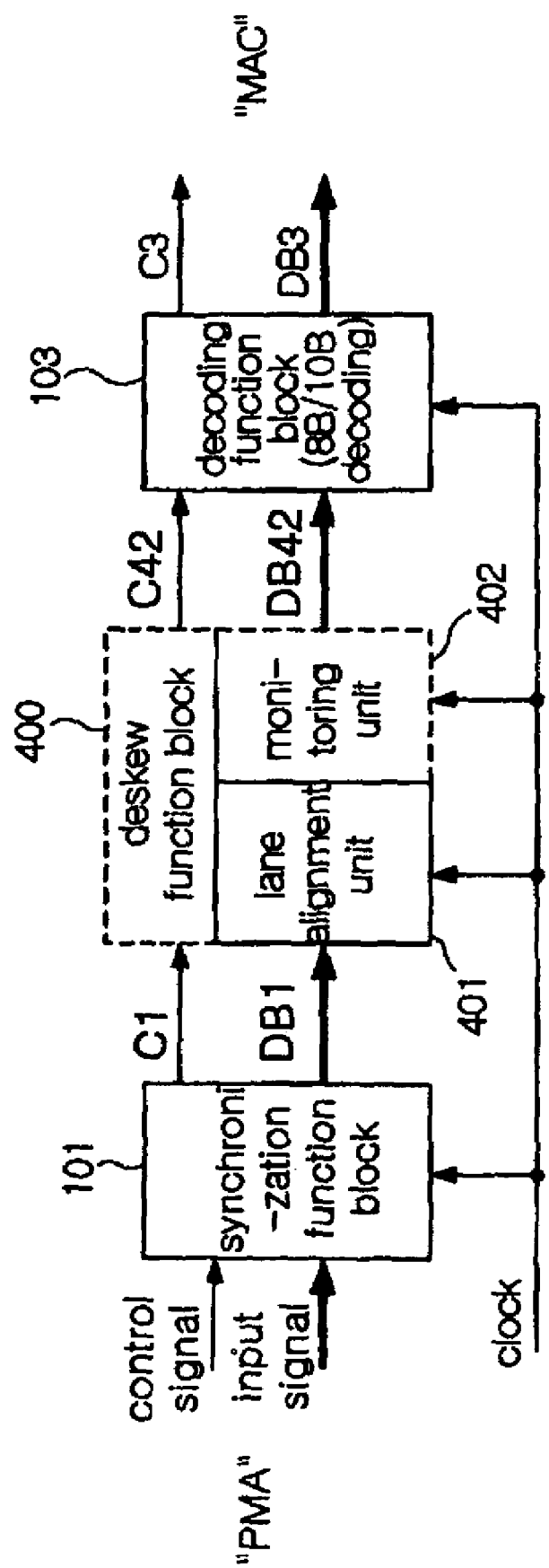
FIG. 4 is a block diagram illustrating an improved PCS in accordance with the present invention.

FIG. 4 is a block diagram illustrating an improved physical coding sublayer (PCS) in accordance with the present invention. With reference to FIG. 4, the PCS is made up of a synchronization function block 101, a deskew function block 400 and a decoding function block 103. The synchronization function block 101 receives control signals, which represents a detection of a signal on each lane, respectively, and 10 bit parallel signals as data streams transmitted from a physical media attachment (PMA) sublayer, detects a synchronization status of each lane by detecting a comma character of an 8B/10B code, and provides synchronization status signals and the data streams to the deskew function block 400. Further, a lane alignment unit 401 contained in the deskew function block 400 receives the control signals and the data streams from the synchronization function block 101 and aligns each lane skewed in a code stream assigned to each lane. Furthermore, a monitoring unit 402 contained in the deskew function block 400 determines a skew by recognizing whether alignment characters of the data streams received into all the lanes simultaneously appear in all the lanes, and sends a determination result to the decoding function block 103. The decoding function block 103 decodes the data streams from the deskew function block 400 in the form of an 8B/10B code to transmit the decoded data streams to a medium access control (MAC) part.

Figure 5:
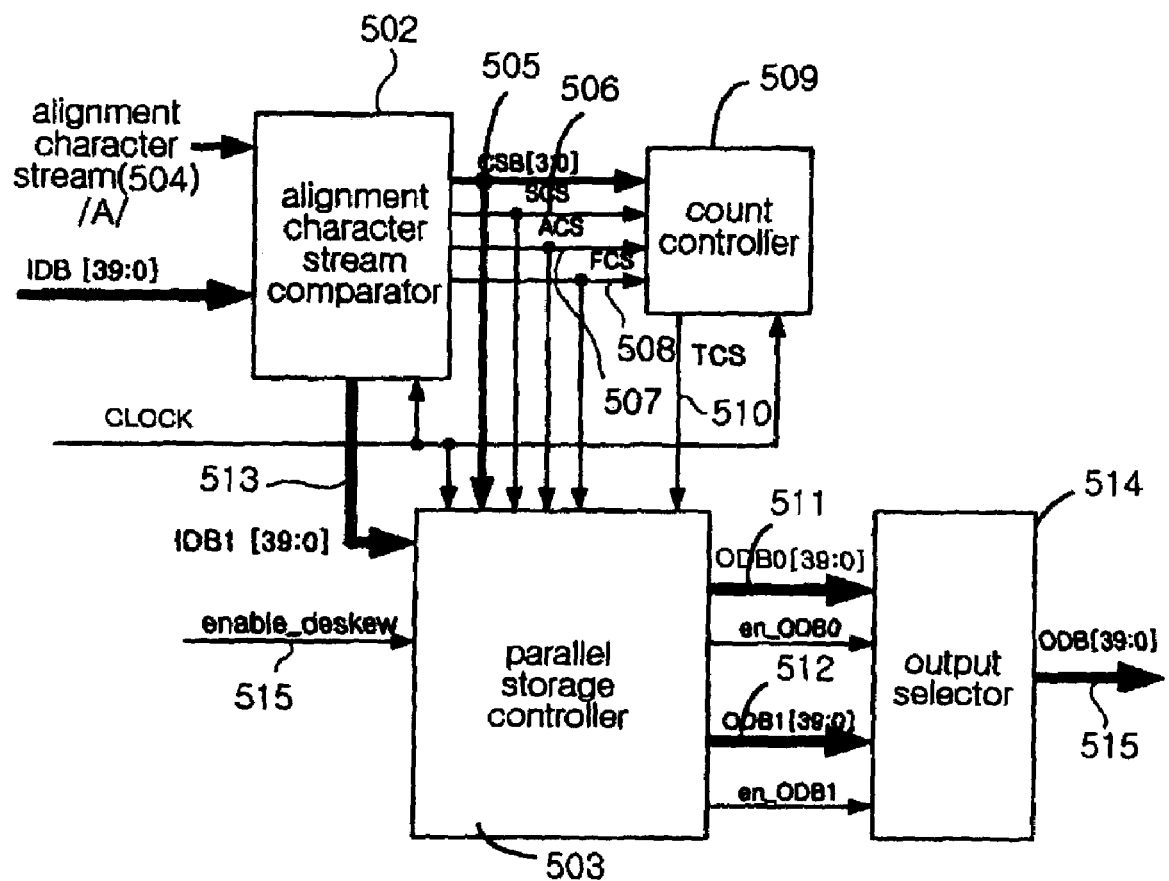
FIG. 5 is a block diagram illustrating a lane alignment unit in accordance with the present invention.

FIG. 5 is a block diagram illustrating the lane alignment unit 401 contained in the deskew function block 400 as shown in FIG. 4. With reference to FIG. 5, the lane alignment unit 401 includes an alignment character stream comparator 502, a parallel storage controller 503, a count controller 509 and an output selector 514. The alignment character stream comparator 502 receives character streams 501 as data streams composed of 4 lanes and detects specific alignment character streams 504. The specific alignment character streams 504 use the alignment character streams of "0011110011_RD+" and "1100001100_RD−" relying on a running parity in an 8B/10B code format and the specific alignment character streams can have other codes according to designers. The alignment character stream comparator 502 determines whether an alignment character of each lane has been received and outputs at least one skew status signal as an alignment character reception status signal and the data streams. In response to the skew status signal, the parallel storage controller 503 carries out a character stream deskew as a lane deskew using a storage device composed of a register having a predetermined capacity. The count controller 509 checks an alignment character reception status provided from the alignment character stream comparator 502 to output a control signal for indicating whether the alignment characters have been received in all the lanes within a deskew setting section from the instant of receiving a first alignment character. The output selector 514 checks whether the lane deskew has been carried out and outputs aligned character streams from the parallel storage controller 503 to the decoding function block 103 if the lane deskew has been carried out. Also, the output selector 514 intactly outputs the character streams to the decoding function block 103, before the lane deskew is carried out.

The alignment character stream comparator 502 detects specific alignment characters from the character streams 501 and compares the alignment characters on a lane-by-lane basis to output the alignment character reception status signal.

The character reception status signal provided from the alignment character stream comparator 502 includes a first control signal (CSB[3:0]) 505, a second control signal (SCS) 506, a third control signal (ACS) 507 and a fourth control signal (FCS) 508. The first control signal (CSB[3:0]) 505 indicates whether an alignment character of each lane has been received. The second control signal (SCS) 506 indicates that alignment characters have been detected in only some lanes. That is, the second control signal (SCS) 506 indicates that a skew has been generated. The third control signal (ACS) 507 indicates that the alignment characters have been simultaneously detected in the four lanes. The fourth control signal (FCS) 508 indicates a time point when a fourth alignment character is detected in a fourth lane as a last lane.

Because the second and third control signals are exclusive to each other, both of the second and third control signals cannot be a high signal.

Further, the fourth control signal 508 is irrespective of a case where the alignment characters have been simultaneously detected in all the lanes or the skew has been generated at different times. Further, the fourth control signal 508 is dependent upon the high signal of the first control signal (CSB[3:0]) 505 and the fourth control signal 508 outputs the high signal when the fourth alignment character and a logical symbol "AND" are detected from the fourth lane.

The control signals described above are transmitted to the count controller 509 and the parallel storage controller 503 in response to an external synchronization clock.

Further, the data streams (IDB1[39:0]) 501 are applied to the parallel storage controller 503 in synchronization with the control signals.

Then, the count controller 509 compares the first to fourth control signals (505-508) provided from the alignment character stream comparator 502. Here, when the skew is generated, i.e., when the second control signal is high, the count controller 509 counts delay bits (e.g., 15 bits) for a maximum skew generation possible period having a skew generation possibility to send a fifth control signal (TCS) 510 indicating a set skew generation possible section.

The reason for setting the delay bits of 15 bits as a maximum skew alignment period is that a maximum skew delay interval is set to 15 bits less than 16 bits because an alignment character stream ‖A‖ to be transmitted from the PCS is randomly generated between 16 bits and 32 bits.

Further, the parallel storage controller 503 stores the character streams and the alignment characters in a storage device composed of a register of "40 bits×16 bits" so that a skew character stream is aligned using the control signals. The storage device stores the 40 bits corresponding to input character streams (IDB1[39:0]) 513 responsive to the external synchronization clock and the 16 bits corresponding to a alignment character stream including a first alignment character (/A/) and a 15-bit delayed alignment character (/A/).

The parallel storage controller 503 outputs first and second output character streams and first and second output control signals. Here, first output character streams (ODBO[39:0]) 511 are the character streams (ODB1[39:0]) 513 to be intactly bypassed from the alignment character stream comparator 503 to the output selector 514 without being processed in the parallel storage controller 511. Further, second output character streams (ODB1[39:0]) 512 are character streams aligned and outputted by the parallel storage controller 503. The output selector 514 selects either the first output character streams (ODBO[39:0]) 511 or the second output character streams (ODB1[39:0]) 512 to output the selected character streams to the decoding function block 103.

When the deskew process is not completed, the parallel storage controller 503 outputs the first output character streams (ODBO[39:0]) 511 to the decoding function block 103. Otherwise, the parallel storage controller 503 outputs the second output character streams (ODB1[39:0]) 512 to the decoding function block 103.

The first and second output control signals transmitted from the parallel storage controller 503 to the output selector 514 indicates whether the first output character streams 511 or the second character streams 512 are valid. The first and second output control signals (en_ODBO and en_ODB1) control an output of the first output character streams 511 or an output of the second output character streams 512 and the first and second output control signals are exclusive to each other.

Accordingly, the output selector 514 outputs valid character streams in response to the first and second output character streams (ODBO[39:0] and ODB1[39:0]) and the first and second output control signals (en_ODBO and en_ODB1).

Here, a designer can modify the character streams of the 40 bits processed by the parallel storage controller 503 according to code characteristics and the number of multiple lanes and flexibly extend the alignment character stream of the 16 bits according to a generation interval of a specific character stream.

Figure 6:
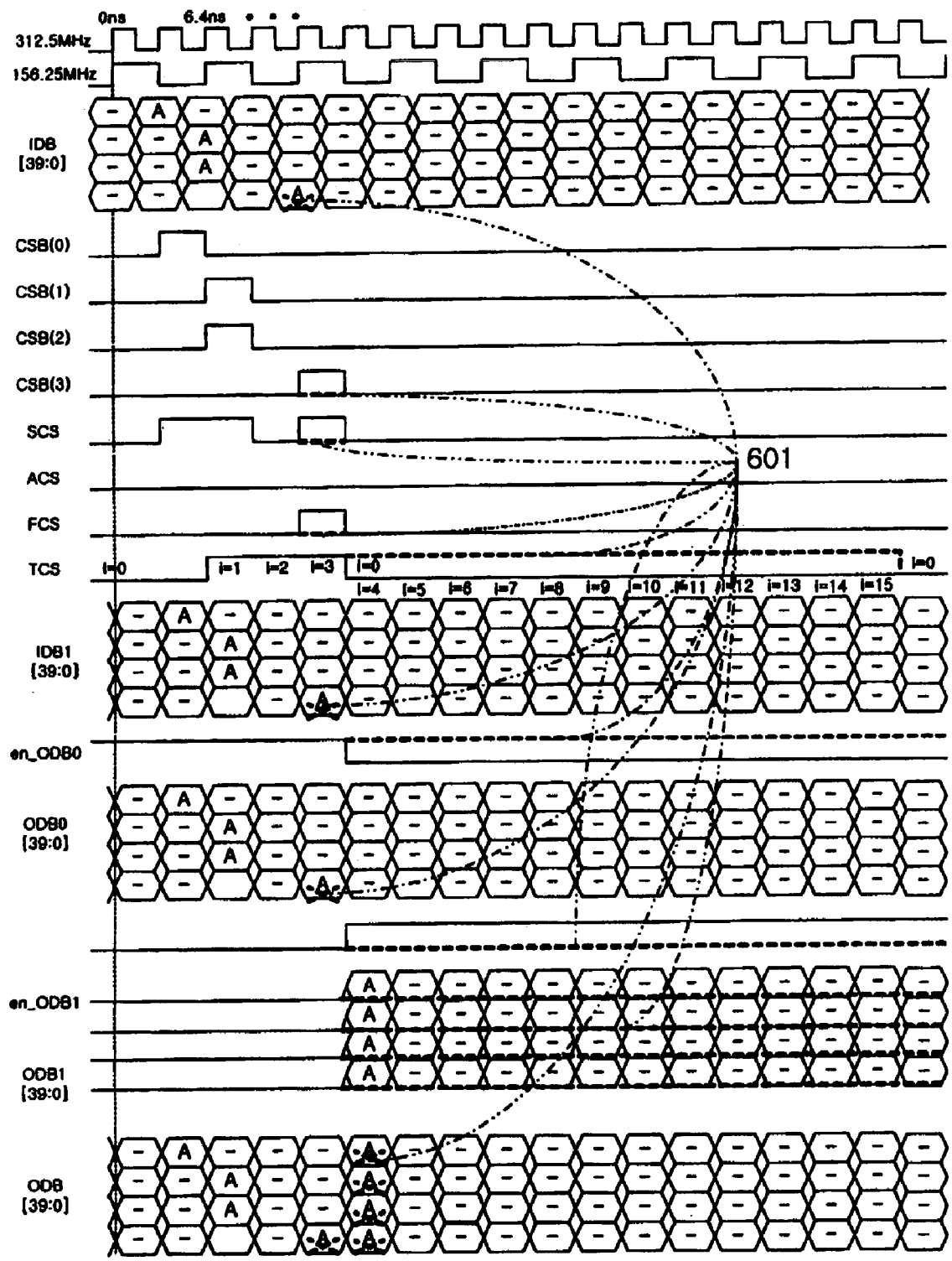
FIG. 6 is a timing chart showing signals from the lane alignment unit in accordance with the present invention.

FIG. 6 is a timing chart showing signals generated from the lane alignment unit 401 as shown in FIG. 5. All the signals indicated in solid lines show a case where all the character streams having the skew are normally received. In such a case, output character streams (ODB[39:0]) 515 are outputted as normally aligned signals.

In FIG. 6, signals indicated in bold dotted lines 601 show a case where the alignment character is not found in a lane 3 after the count controller 509 counts the 15-bit delay. In such a case, the lane alignment unit 401 enters an initial state. Further, in the case, the output selector 514 outputs the first output character streams 511 as the output character streams 515 because the parallel storage controller 503 has not carried out a lane alignment. Furthermore, if the lane alignment is completed, the output selector 514 outputs the second output character streams 512 as the output character streams 515.

Figure 7:
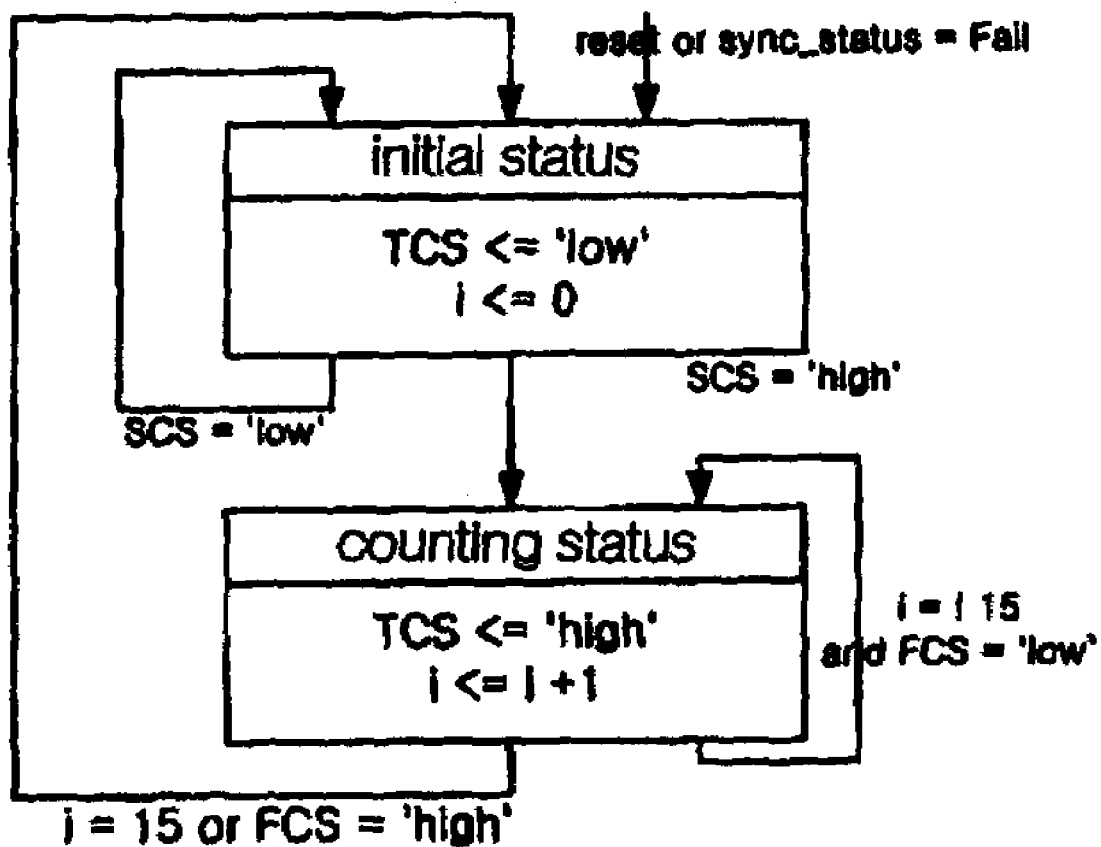
FIG. 7 is a flow chart illustrating status of a count controller in accordance with the present invention.

FIG. 7 is a flow chart illustrating status of the count controller 509 in accordance with the present invention.

When the second control signal as described above is high in the initial state, the counting is performed and the fifth control signal 510 is high to indicate a counting section. The fifth control signal 510 is high before a 'low signal' requirement is met.

Here, the 'low signal' requirement means a case where the alignment character streams are detected in all the lanes or where the set delay time has completely lapsed. When the fourth control signal 508 is high in the course of a counting process, it means that the alignment characters have been detected in all the lanes. Accordingly, the fifth control signal 510 is low and the count controller 509 prepares a next alignment character detection.

On the other hand, where the fourth control signal 508 is not high for the 15-bit delay interval after the second control signal 506 is high and the counting starts, it means that a transmission error of an alignment character (/A/) has been generated in any lane. Accordingly, the fifth control signal 510 is low at a 15-th delay section and the count controller 509 prepares a next alignment character detection.

Figure 8:
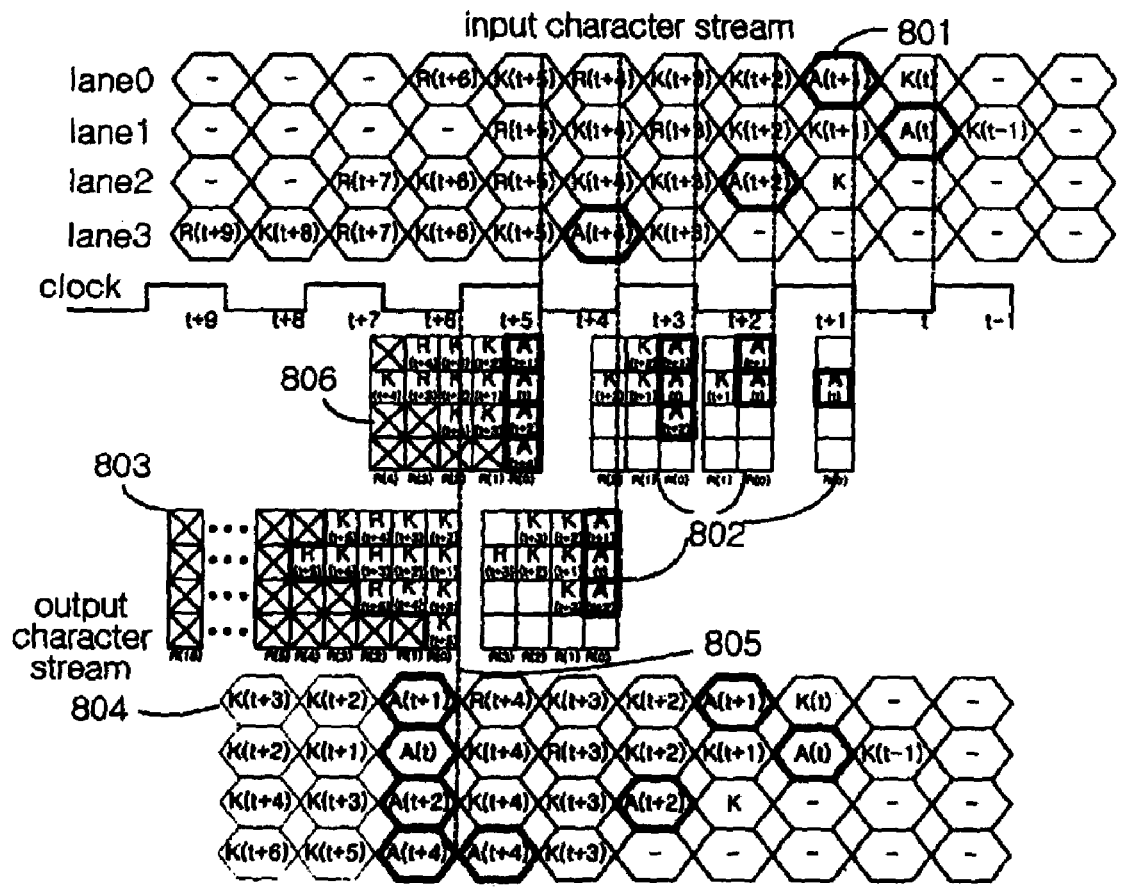
FIG. 8 is a view showing an input timing of a parallel storage controller contained in the lane alignment unit, an output timing of an output selector and signals of input/output data streams in accordance with the present invention.

FIG. 8 shows a structure of the storage device according to input character streams 801 of the parallel storage controller 503 and a timing of output character streams of the parallel storage controller 503. Here, the parallel storage controller 503 is used for 10 GBASE-X 10 Gbps Ethernet.

A register of the parallel storage controller 503 is implemented in the form of "40 bits×16 bits". Each of the four lanes stores a 10 bit stream. Here, a designer can modify the character streams of the 40 bits processed by the parallel storage controller 503 according to code characteristics and the number of multiple lanes. Further, the designer can flexibly extend the alignment character stream of the 16 bits according to a generation interval of a specific character stream transmitted from the PCS.

As shown in FIG. 8, where alignment characters A of each lane are inaccurately inputted into the input character streams 801, an input character stream in which the alignment character is detected is stored in a first storage column R(0) by the control signals generated from the alignment character stream comparator 502 and the count controller 509. When the alignment characters of each lane are detected, the first control signal (CSB(x)) 505 (where the 'x' denotes a corresponding lane) is high. Further, when an alignment request signal (enable_deskew) is a TRUE signal, the character streams are stored in a storage block 802 in a FIFO (first-in first-out) scheme. Here, the alignment character is always located in a first storage column R(0) and the first storage column R(0) acts as an exit of the aligned character streams.

When the control signal (FCS), which indicates that the alignment characters of all the lanes have been detected, is high, the parallel storage controller 503 designates a last storage section for each lane. A register column is an entrance storage column into which the input data streams come. A storage section in which the input data stream does not exist is not used in a storage block 806.

Further, at a time point 805 when the fourth control signal 508 is high, the character streams of respective registers are shifted in response to the external input clock and the character streams are aligned to an output terminal of the storage device to transmit output character streams 804 shown in FIG. 8.

Until a deskew request signal (enable_deskew) is again a TRUE signal, the process described above is maintained and the output continues according to a predetermined delay. If the deskew request signal (enable_deskew) is the TRUE signal, the deskew process restarts.

Figure 9:
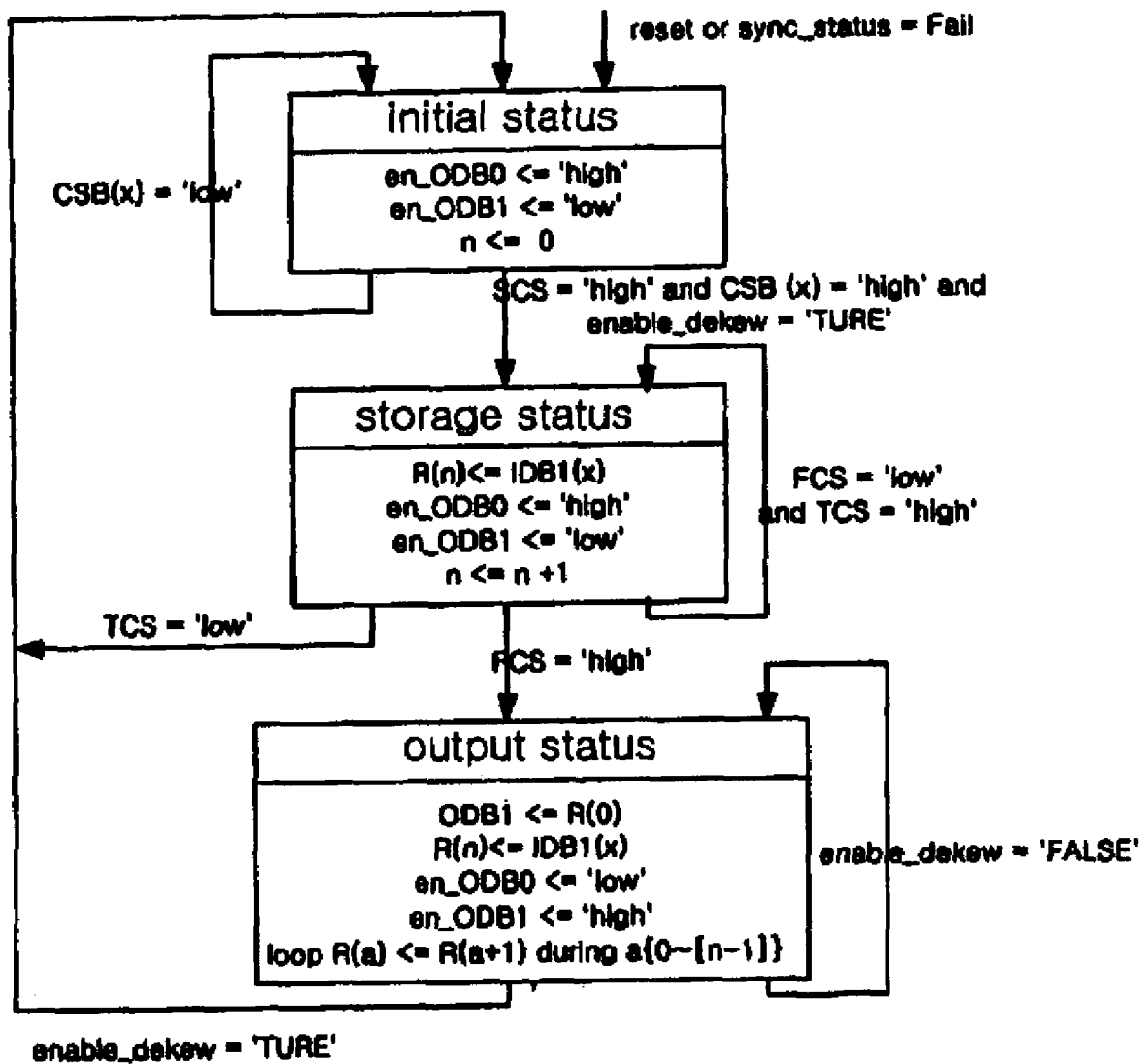
FIG. 9 is a flow chart illustrating status of a parallel storage controller of an individual lane in accordance with the present invention.

FIG. 9 is a flow chart illustrating status of the parallel storage controller 503. The parallel storage controller 503 outputs the first output control signal (en_ODB0) of the high signal and the second output control signal (en_ODB1) of the low signal so that the data streams received are outputted through the first output character streams 511 in the initial state.

Further, when the second control signal 506 and the first control signal (CSB(x)) 505 from the alignment character stream comparator 502 are high, respectively, the storage block of a corresponding x lane enters a storage status and a storage column R(n=0) stores data first of all, the N denoting an address of the register. The alignment characters are always positioned in the storage column R(0). In response to the external input clock, the character streams inputted are stored with the address being increased by '1'.

When the control signal (FCS) 508 from the alignment character comparator 502 is high, it means that the detection for the alignment characters contained in all the lanes has been completed. At this time, the output is performed from the storage column R(0) of the parallel storage controller 503. An address value n is stored after a last storage process is carried out, and the character stream of the storage column R(n) is stored in the storage device.

Thereafter, the storage device is put in an output state and then performs a shift register function. The character stream of the storage column R(n) is continuously outputted and another character stream is continuously inputted into the storage column R(n).

The output state is a state where the alignment for each lane has been accomplished. In the output state, the first control signal (en_ODB0) and the second control signal (en_ODB1) outputted to the output selector 514 is low and high, respectively. Accordingly, the output selector 514 selectively outputs two types of the aligned character streams from the parallel storage controller 503.

If the parallel storage controller 503 is put in a storage state and the fifth control signal 407 is not high until the fifth control signal 407 is transited from the high signal to the low signal, an alignment character error is generated in any lane of the four lanes. Accordingly, the lane alignment cannot be accomplished in the maximum alignment section (15-bit delay). Further, the parallel storage controller 503 returns to the initial state at a falling edge of the fifth control signal 510 and continue to detect other alignment characters.

When the parallel storage controller 503 is put in the output state, the parallel storage controller 503 is independent of the control signals (CSB, SCS and FCS) and continues to transmit the aligned character stream through the storage device. The parallel storage controller 503 is put in the initial state by the deskew request signal (enable_deskew) only.

As apparent from the above description, the present invention provides a method capable of transmitting multiple lanes with one data channel by structuring a lane alignment unit within a physical coding sublayer (PCS) so that several-Gbps multiple lanes can be parallel processed for a 10 Gbps data transmission, thereby implementing a system for a high-speed channel transmission of more than 10 Gbps to be developed in the future as well as a 10 Gbps optical fiber channel and a 10 Gbps Ethernet.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for carrying out a deskew among multiple lanes for use in a division transmission of large-capacity data, comprising:

first means for detecting alignment characters based on a lane-by-lane basis from character streams as data streams received into the multiple lanes and outputting first signals representing a reception status of an alignment character of each lane, respectively;

second means responsive to the first signals from the first means for outputting second signal to indicate whether the alignment characters have been detected in all the lanes within a deskew setting section from the instant of detecting a first alignment character from one lane;

parallel storage control means responsive to the first and second signals and the received data streams for setting data being subsequent to the alignment character of each lane and sequentially storing the data in a storage device, sequentially outputting the stored data to align the data streams if the data of one section is completely stored; and output selection means for intactly outputting the data streams before the deskew is completely accomplished in the storage device and outputting the aligned data streams from the parallel storage control means after the deskew is completely accomplished.

2. The apparatus according to claim 1, wherein the first means detects an alignment character from each lane to output a first control signal for indicating whether the alignment character has been detected on a lane-by-lane basis, a second control signal for indicating whether the alignment characters have been detected in some lanes, a third control signal for indicating whether the alignment characters have been simultaneously detected in the all lanes, and the fourth control signal for indicating whether an n-th alignment character has been detected, the n being the number of the multiple lanes.

3. The apparatus according to claims 1 or 2, wherein the second means counts a first setting time to output a fifth control signal having a high level from a time of a first alignment character detection to a time of a last alignment character detection or a time of a counting completion of the first setting time when the first control signal is a first high level signal.

4. The apparatus according to claim 3, wherein the first setting time corresponds to a maximum generation possible section for the skew being generated among the multiple lanes.

5. The apparatus according to claim 4, wherein the first setting time corresponds to 15 bits.

6. The apparatus according to claim 1, wherein the parallel storage control means stores the alignment characters in a first storage column R(0) of the storage device and sequentially stores the data subsequent to the alignment characters in the storage device when a skew among the multiple lanes is generated and the alignment characters based on the lane-by-lane basis are detected, and the parallel storage control means sets a last storage column to a last storage section of each lane when the alignment characters are detected in all the lanes, and the parallel storage control means outputs the data of the first storage column on the basis of a FIFO (first-in first-out) scheme if another data is inputted into the last storage section while the stored data is shifted in response to a clock signal, thereby outputting aligned character streams to which a predetermined delay is assigned for the deskew among the multiple lanes.

7. The apparatus according to claim 6, wherein the parallel storage control means again carries out the deskew when a deskew request signal is generated in the course of maintaining an aligned state.

8. A large-capacity Ethernet reception system having a function of a deskew among multiple lanes for use in a division transmission of large-capacity data, comprising:

synchronization means for receiving control signals representing a signal detection of each lane and data streams as 10-bit parallel signals from a physical media attachment (PMA) sublayer, detecting a synchronization state of each lane through a detection of a comma character of an 8B/10B code, and outputting the data streams and at least one synchronization state signal generated from the detected synchronization state;

deskew means having a lane alignment unit for receiving the data streams and the synchronization state signals and aligning a data stream of each lane having a skew, and a monitoring unit for determining the skew by monitoring whether alignment characters of the data streams from the lane alignment unit simultaneously appear in all the lanes and transmitting a determination result;

decoding means for decoding aligned data streams from the deskew means in the form of the 8B/10B code and providing the decoded data streams to a medium access control (MAC) part.

9. A method for carrying out a deskew among multiple lanes upon receiving large-capacity data from the multiple lanes, comprising the steps of:

a) recognizing and detecting alignment characters from data streams on a lane-by-lane basis;

b) determining whether a skew among the lanes is generated by comparing reception points of the alignment characters for respective lanes;

c) if the skew among the lanes is generated, storing the alignment characters in a first storage column of a shift register on the lane-by-lane basis and storing data being subsequent to the alignment characters in a second storage column;

d) at a time of a last alignment character detection, setting a last storage section on the lane-by-lane basis and indicating an alignment completion;

e) shifting the data to output the data stored in the first storage column when the data is inputted into the last storage section; and f) intactly outputting the data streams before the deskew is completely accomplished in the storage device and outputting the aligned data streams after the deskew is completely accomplished.

10. A storage medium for a large-capacity Ethernet reception system, the storage medium storing a program configured to perform the steps of:

a) recognizing and detecting alignment characters from data streams on a lane-by-lane basis;

b) determining whether a skew among lanes is generated by comparing reception points of the alignment characters for respective lanes;

c) if the skew among the lanes is generated, storing the alignment characters in a first storage column of a shift register on the lane-by-lane basis and storing data being subsequent to the alignment characters in a second storage column;

d) at a time of a last alignment character detection, setting a last storage section on the lane-by-lane basis and indicating an alignment completion;

e) shifting the data to output the data stored in the first storage column when the data is inputted into the last storage section; and f) intactly outputting the data streams before a deskew is completely accomplished in the storage device and outputting the aligned data streams after the deskew is completely accomplished.

* * * * *